(12) United States Patent
Dunna et al.

(10) Patent No.: US 10,688,825 B2
(45) Date of Patent: Jun. 23, 2020

(54) WHEEL RETENTION SYSTEM

(71) Applicant: Consolidated Metco, Inc., Vancouver, WA (US)

(72) Inventors: Pavan Kumar Dunna, Camas, WA (US); Kaustubh Pradeep Deshmukh, Hillsboro, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 154 days.

(21) Appl. No.: 15/794,595

(22) Filed: Oct. 26, 2017

(65) Prior Publication Data

US 2019/0126672 A1    May 2, 2019

(51) Int. Cl.
  *B60B 27/00*  (2006.01)
  *F16B 39/00*  (2006.01)
  *B60B 3/16*   (2006.01)

(52) U.S. Cl.
  CPC ............. *B60B 27/00* (2013.01); *B60B 3/16* (2013.01); *F16B 39/00* (2013.01)

(58) Field of Classification Search
  CPC .............................. F16B 33/002; B60B 27/00
  See application file for complete search history.

(56) References Cited

U.S. PATENT DOCUMENTS

| | | | |
|---|---|---|---|
| 3,386,771 A | 6/1968 | Verdier et al. | |
| 3,724,907 A * | 4/1973 | Housel | B60B 27/02 301/105.1 |
| 5,090,778 A * | 2/1992 | Laudszun | B60B 27/001 301/105.1 |
| D381,615 S | 7/1997 | Smith et al. | |
| 6,196,639 B1 | 3/2001 | Di Ponio et al. | |
| 6,866,345 B2 * | 3/2005 | Fakhoury | B60B 27/02 301/105.1 |
| 7,044,563 B2 * | 5/2006 | Suzuki | B60B 27/00 301/105.1 |
| 8,287,052 B2 | 10/2012 | Fakhoury et al. | |
| 8,292,373 B2 | 10/2012 | Rieger et al. | |
| 2002/0174543 A1 * | 11/2002 | Brinker | B23B 5/02 29/898.07 |
| 2005/0073190 A1 | 4/2005 | Wakisaka et al. | |
| 2005/0206221 A1 * | 9/2005 | Brinker | B23B 5/02 301/105.1 |
| 2008/0024003 A1 | 1/2008 | White et al. | |
| 2009/0096276 A1 | 4/2009 | Orey et al. | |

(Continued)

OTHER PUBLICATIONS

International Search Report and Written Opinion in corresponding International Application No. PCT/US18/57537, dated Jan. 4, 2019, 9 pages.

*Primary Examiner* — Jason R Bellinger
(74) *Attorney, Agent, or Firm* — Fitch, Even, Tabin & Flannery LLP (57) ABSTRACT

A wheel retention system is provided for retaining a wheel on a vehicle. The system includes a plurality of connector receiving openings in a wheel hub flange, with each wheel hub flange including a raised bolt stop at each bolt receiving opening. A plurality of threaded connectors or bolts is provided, with each bolt received in one of the bolt receiving openings. Each bolt has a head with a flattened or clipped surface that meshes with the raised bolt stop in each bolt receiving opening on the wheel hub flange. These raised bolt stops positively prevent the bolts from rotating in the openings.

22 Claims, 7 Drawing Sheets

(56) References Cited

U.S. PATENT DOCUMENTS

| | | | |
|---|---|---|---|
| 2010/0084911 A1* | 4/2010 | Ilg | F16D 65/12 |
| | | | 301/105.1 |
| 2011/0291468 A1 | 12/2011 | Rieger et al. | |
| 2014/0339027 A1 | 11/2014 | Wurth et al. | |
| 2015/0015058 A1* | 1/2015 | Perini | B60B 27/00 |
| | | | 301/105.1 |

* cited by examiner

FIG. 1

PRIOR ART

WHEEL RETENTION SYSTEM

BACKGROUND OF THE INVENTION

The present invention relates generally to a wheel hub system which retains wheels on commercial vehicles, and more particularly to a system employing a threaded connector which mates with a wheel hub opening having a bolt stop.

Figure 2:
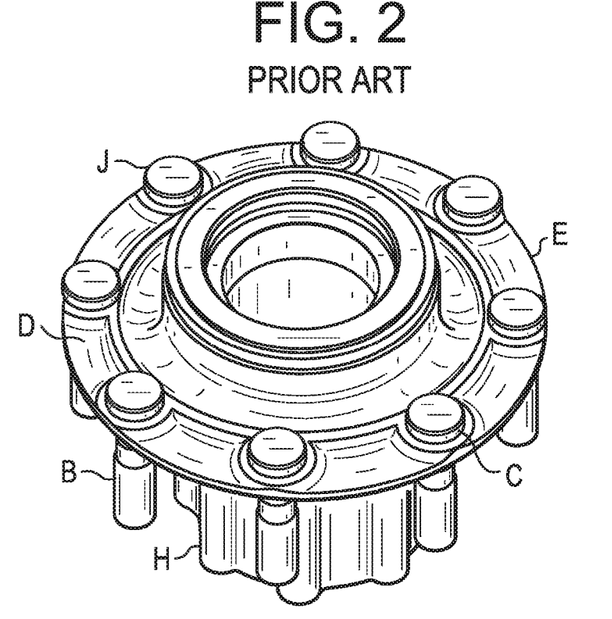
FIG. 2 is a perspective view of a prior art wheel hub and components.
Figure 2A:
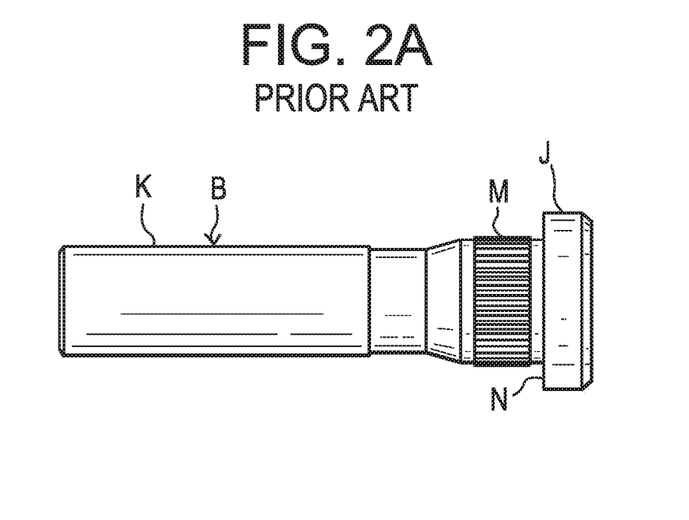
FIG. 2A is a side view of a prior art threaded fastener.

Conventionally, wheel hubs are made out of ductile iron or aluminum, which are machined and assembled to mate with other components of a vehicle. For example, FIGS. 2 and 2A provide a view of a generally bell-shaped prior art wheel hub H attached in a conventional manner to a vehicle axle (not shown). A connector, such as a stud or bolt B extends through a bored cylindrical hole C defined by a mounting flange D of hub H. Typically a plurality of holes C are equally spaced around the periphery of the wheel hub mounting flange D, each receiving a bolt B.

The bolts B are used to secure together the hub H, sometimes a brake drum (not shown), and a wheel (not shown) upon which is mounted a tire (not shown). The bolts B each have a head J at one end, and a threaded portion K at the opposite end. A wheel nut (not shown) engages the bolt threaded portion K to secure the wheel to the hub H. The bolt B has a serrated shoulder portion M which is typically press-fit into cylindrical hole C to affix the bolt to hub H. The bolt head J has undersurface N, which is substantially perpendicular to a longitudinal axis of bolt B, and is seated substantially flat against the hub inboard surface E.

A vehicle wheel hub H is typically subjected to two types of stress which limit service life: (1) the mean stress imparted by tightening the wheel nuts, which has the effect of drawing the hub inboard surface E down into hole C; (2) stress caused by the serrated surface of the threaded bolt resisting rotation in the opening in the wheel flange due to the interference fit of the serrated portion of the bolt in the wheel flange opening. The combined stresses have a negative impact on the service life of the wheel hub H. Additionally, it is quite common for mechanics to over-tighten the wheel nuts when changing tires, resulting in over-stretching or over-tensioning the bolts B and further increasing the stress, which shortens the service life of the wheel hub H.

SUMMARY OF THE INVENTION

One embodiment of the present invention is directed to a wheel retention system for retaining a wheel on a vehicle. The system includes a plurality of bolt receiving openings in the wheel hub flange, with each wheel hub flange including a raised bolt stop at each bolt receiving opening. A plurality of threaded connectors or bolts is provided, with each bolt received in one of the bolt receiving openings. Each bolt has a head with a flattened or clipped surface that meshes with the raised bolt stop in each bolt receiving opening on the wheel hub flange. These raised bolt stops positively prevent the bolts from rotating in the openings. The advantage of the assembly is that it restricts rotation of the stud and reduces the stress in the hub mounting flange area.

DETAILED DESCRIPTION

Figure 1:
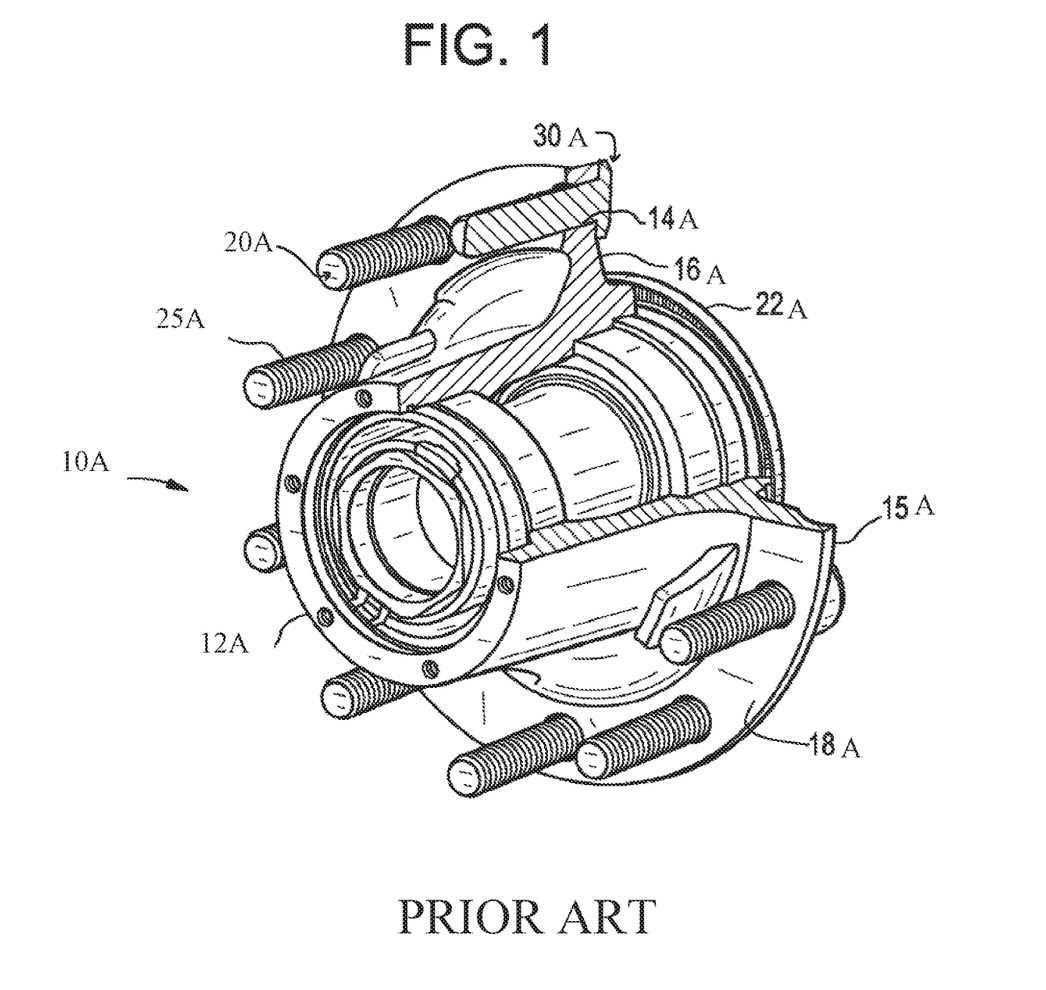
FIG. 1 is a perspective, partial cut away view of a prior art wheel hub.

FIG. 1 illustrates a prior art wheel retention system 10A according to one embodiment of the invention. System 10A includes a roughly bell-shaped wheel hub 12A having a barrel portion which attaches to an axle by bearings. A cylindrical opening 14A, which may be formed by a drilling operation, is defined by an outer peripheral mounting flange 15A of the wheel hub 12A. Opening 14A extends from an inboard surface 16A to an outboard surface 18A of wheel hub mounting flange 15A.

A connector, such as a threaded wheel bolt 20A, is illustrated with the shank 22A at one end, and a threaded portion 25A at an opposing end. Shank 22A is fitted into a cylindrical opening 14A of the wheel hub mounting flange 15A. The bolt shank 22A extends through opening 14A. A wheel nut (not shown) engages the threaded portion 25A having threads to mount a wheel and tire on wheel hub 12 A. The bolt 20A has a head 30A with an undersurface 32A serving as a contact surface with the inboard surface 16A of wheel hub flange 15A. Typically a plurality of openings 14A are equally spaced around the periphery of the wheel hub mounting flange 15A, each receiving a bolt 20A, with the number of bolts depending upon the mounting system bolt circle diameter. A detailed view of a prior art wheel hub and threaded fastener are shown in FIGS. 2 and 2A and are described above.

Figure 3:
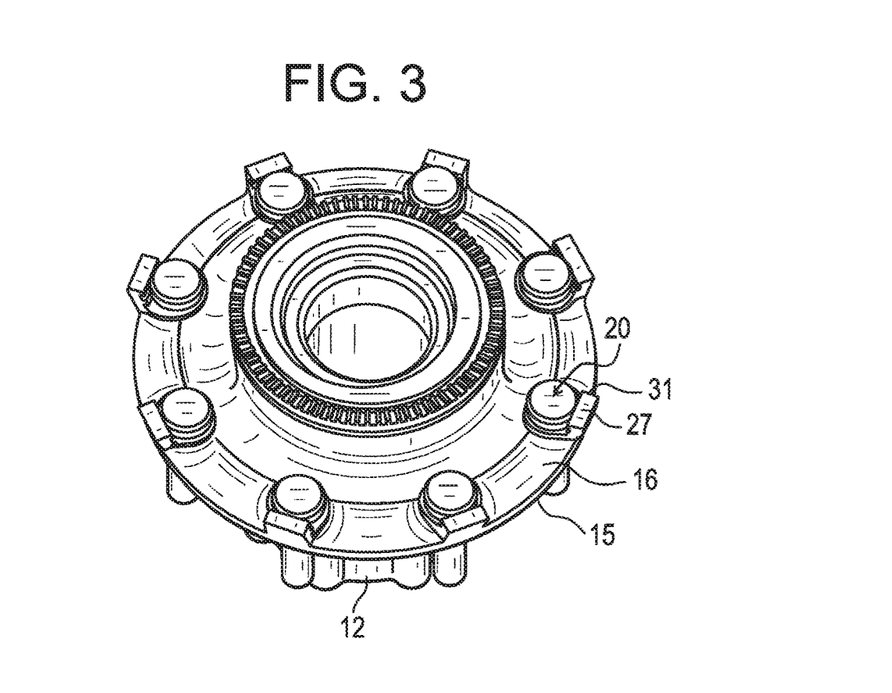
FIG. 3 is a perspective view of a wheel hub and components according to one embodiment of the present invention.
Figure 4:
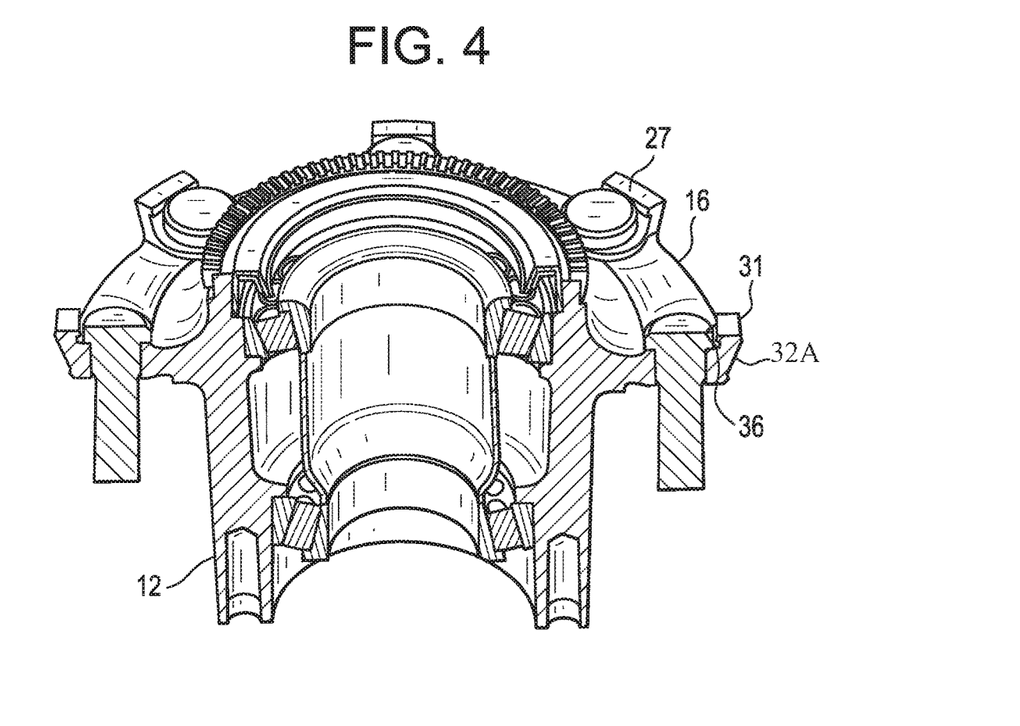
FIG. 4 is a perspective, partial cut away view of a wheel hub and components according to one embodiment of the present invention.

FIGS. 3 and 4 illustrate an embodiment of wheel retention system 10 according to the present invention. As particularly shown, wheel hub mounting flange 15 includes an integral bolt stop 31 adjacent each opening 14. Bolt stop 31 is seen to comprise a radially inner facing flat surface 36 that covers about 90 degrees of cylindrical opening 14. Bolt stop 31 also is comprised of an axially outer edge 32A. Bolt stop 31 is seen to be integral with and extend from an outer radial edge of wheel hub flange 15.

Figure 5:
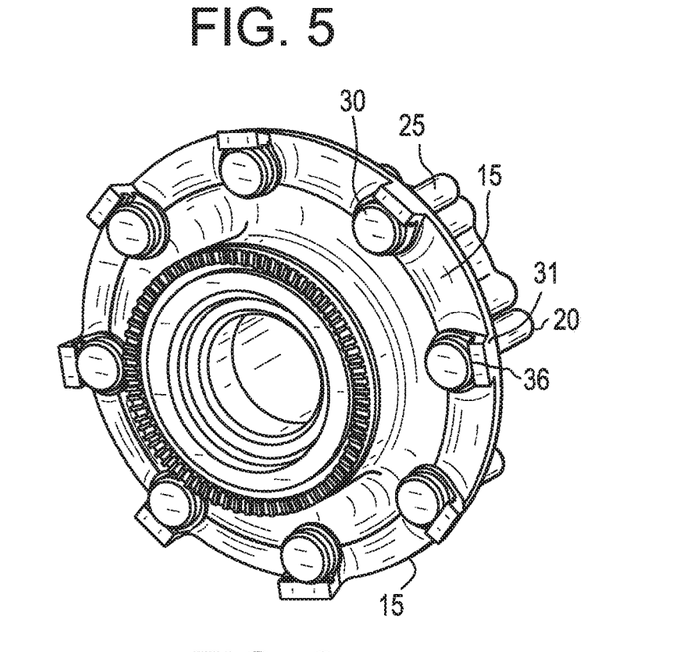
FIG. 5 is a perspective view of a wheel hub and components according to one embodiment of the present invention.
Figure 6:
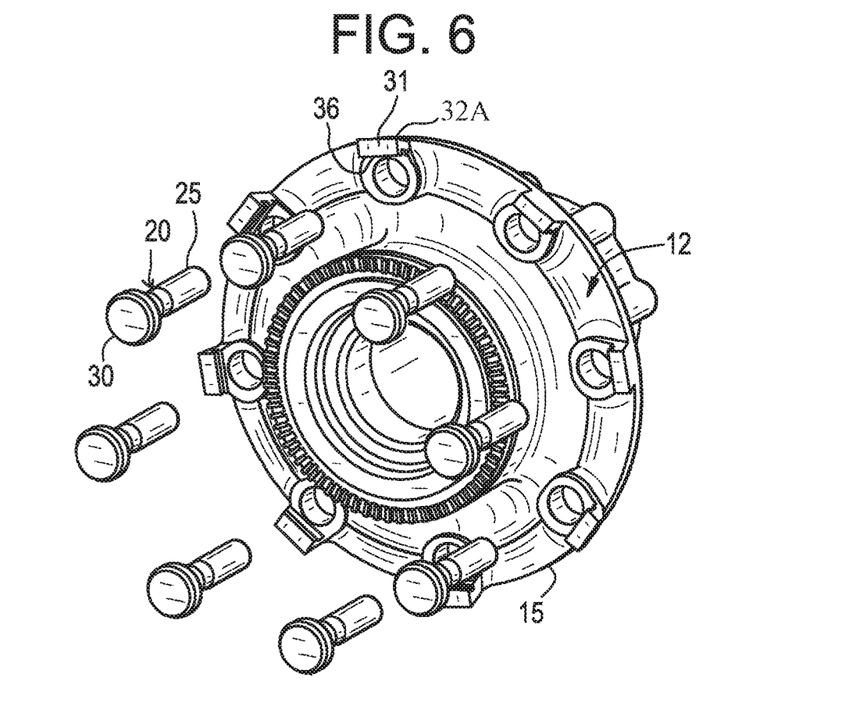
FIG. 6 is a perspective, exploded view of a wheel hub and components according to one embodiment of the present invention.

In FIGS. 5 and 6, wheel hub 12 is seen with wheel hub mounting flange 15. Bolt stop 31 is seen with inner facing flat surface 36 against which corresponding flat surface 21 of bolt head 30 meshes or abuts.

Bolt 20 with shank 22 is seen to pass through cylindrical opening 14 with any type of fit, meaning there can be a clearance to an interference fit between the shank and the opening. While shank 22 may include serrations, it is meant to pass through opening 14 in a little to no interference manner. In sum, while bolt 20 with shank 22 is held in opening 14, it is not necessarily press fit to pass there through. Accordingly, there is little to no stress on wheel hub mounting flange 15 due to bolt 20 passing through opening 14.

However, bolt head 30 includes a flat section 21 that corresponds to about 90 degrees of the circumference of bolt head 30. Bolt head flat section 21 meshes or abuts flat surface 36 of bolt stop 31. This meshing provides the rotational restriction for bolt 20 to allow wheel nuts to be assembled thereon and accordingly hold the brake drum (if present) and wheel to wheel hub 12.

Figure 7:
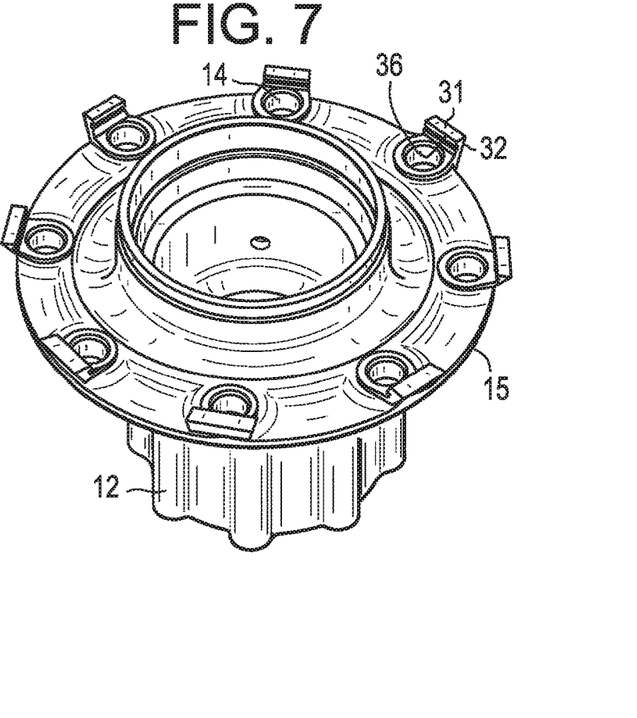
FIG. 7 is a perspective view of a wheel hub according to one embodiment of the present invention.
Figure 8:
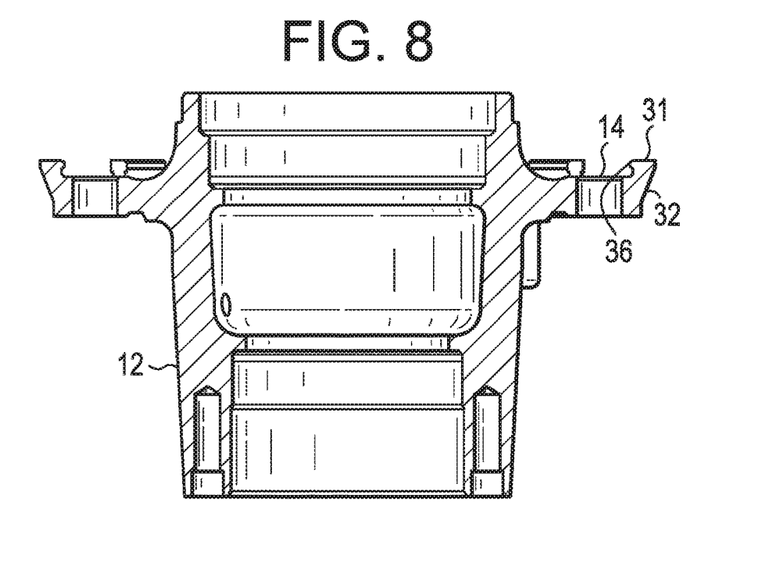
FIG. 8 is a side cut away view of a wheel hub according to one embodiment of the present invention.
Figure 9:
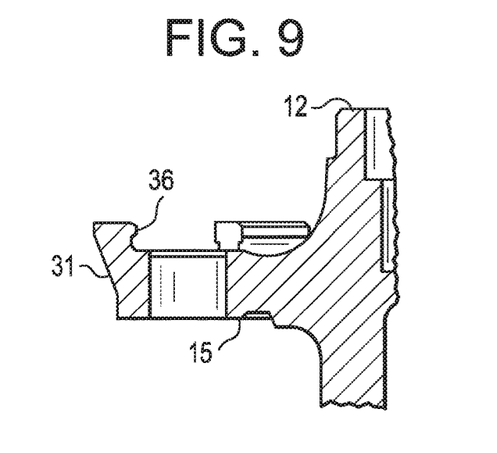
FIG. 9 is a partial, side cut away view of a wheel hub according to one embodiment of the present invention.
Figure 10:
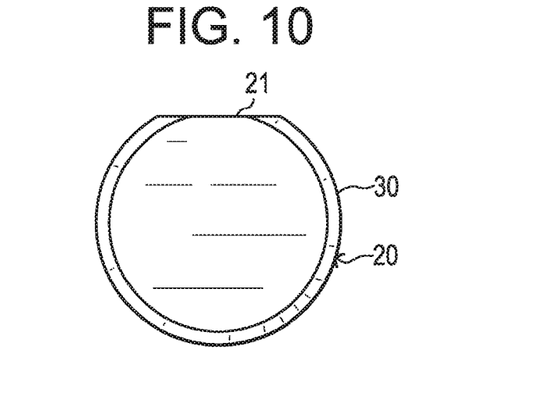
FIG. 10 is a top view of a threaded fastener in accordance with one embodiment of the present invention.
Figure 11:
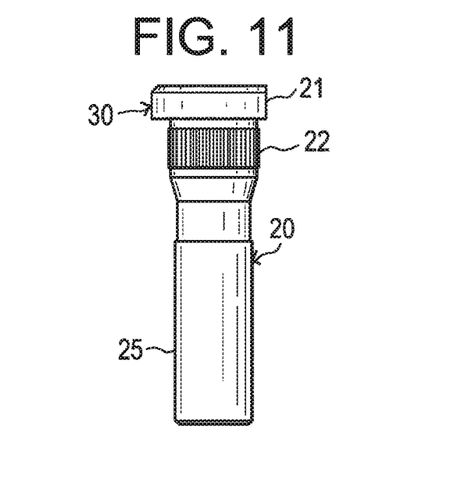
FIG. 11 is a side view of a threaded fastener in accordance with one embodiment of the present invention.
Figure 12:
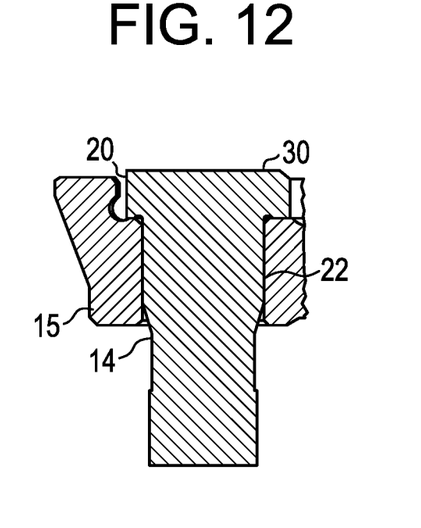
FIG. 12 is a side cut away view of a threaded fastener in an opening in a wheel hub flange in accordance with one embodiment of the present invention.
Figure 13:
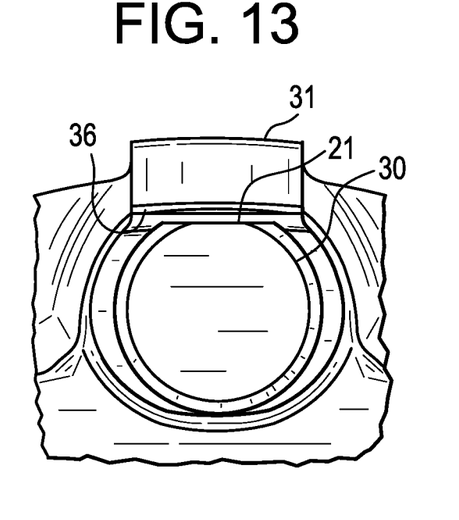
FIG. 13 is a top view of a threaded fastener in an opening in a wheel hub flange in accordance with one embodiment of the present invention.

Referring now to FIGS. 7, 8 and 9, detailed views of wheel hub 12 with bolt stop 31 are provided. As particularly shown, wheel hub mounting flange 15 includes an integral bolt stop 31 adjacent each opening 14. Bolt stop 31 is seen to comprise a radially inner facing flat surface 36 that covers about 90 degrees of cylindrical opening 14. Bolt stop 31 also is comprised of an axially outer edge 32. Bolt stop 31 is seen to be integral with and extend from an outer radial edge of wheel hub flange 15.

Referring now to FIGS. 10, 11, 12, and 13, threaded wheel bolt 20, is illustrated with the shank 22 at one end, and a threaded portion 25 at an opposing end. Bolt head 30 includes a flat section 21 that corresponds to about 90 degrees of the circumference of bolt head 30. Bolt head flat section 21 meshes or abuts flat surface 36 of bolt stop 31. This meshing provides the rotational restriction for bolt 20 to allow wheel nuts to be assembled on the threaded section 25 and accordingly hold the brake drum (if present) and wheel to wheel hub 12.

What is claimed is:

1. A wheel retention assembly comprising:
a wheel hub having a flange with a plurality of openings and a bolt stop raised section adjacent each opening;
a plurality of threaded fasteners each having a length and configured to be received in one of the wheel flange openings,
each threaded fastener having an upper head and a lower shank, each upper head having an upper surface extending transverse to the length of the threaded fastener, a side surface extending along the length toward the lower shank, and an underside surface extending inwardly from the side surface to the lower shank,
each upper head side surface having a flattened portion,
the flattened portion of the upper head side surface of each threaded fastener head configured to be in confronting relation with one of the bolt stop raised sections of the wheel hub flange and inhibit rotation of the threaded fastener with the lower shank of the threaded fastener extending in the opening adjacent the one bolt stop raised section and the underside surface of the threaded fastener head seated against the wheel hub flange,
the wheel hub bolt stop raised sections each include an upstanding wall extending tangentially to the adjacent opening.

2. The wheel retention assembly of claim 1 wherein:
each threaded fastener comprising a threaded portion extending axially through the wheel hub flange opening and beyond the wheel flange.

3. The wheel retention assembly of claim 1 wherein:
the wheel hub bolt stop raised sections include planar surfaces configured to abut the flattened portions of the upper head side surfaces of the threaded fasteners.

4. The wheel retention assembly of claim 1 wherein:
the threaded fasteners are received in the wheel hub flange openings in clearance fit.

5. The wheel retention assembly of claim 1 wherein the bolt stop raised sections and the flange of the wheel hub have a unitary, one-piece construction.

6. A wheel retention assembly comprising:
a wheel hub having a flange with a plurality of openings and a bolt stop raised section adjacent each opening,
a plurality of threaded fasteners each having a length and configured to be received in one of the wheel flange openings,
each threaded fastener having an upper head and a lower shank, each upper head having an upper surface extending transverse to the length of the threaded fastener, a side surface extending along the length toward the lower shank, and an underside surface extending inwardly from the side surface to the lower shank,
each upper head side surface having a flattened portion,
the flattened portion of the upper head side surface of each threaded fastener head configured to be in confronting relation with one of the bolt stop raised sections of the wheel hub flange and inhibit rotation of the threaded fastener with the lower shank of the threaded fastener extending in the opening adjacent the one bolt stop raised section and the underside surface of the threaded fastener head seated against the wheel hub flange,
the wheel hub flange openings each have a circumference,
the wheel hub bolt stop raised section extends for less than the entire circumference of the adjacent wheel hub flange opening.

7. A wheel retention assembly comprising:
a wheel hub having a flange with a plurality of openings and a bolt stop raised section adjacent each opening,
a plurality of threaded fasteners each having a length and configured to be received in one of the wheel flange openings,
each threaded fastener having an upper head and a lower shank, each upper head having an upper surface extending transverse to the length of the threaded fastener, a side surface extending along the length toward the lower shank, and an underside surface extending inwardly from the side surface to the lower shank,
each upper head side surface having a flattened portion,
the flattened portion of the upper head side surface of each threaded fastener head configured to be in confronting relation with one of the bolt stop raised sections of the wheel hub flange and inhibit rotation of the threaded fastener with the lower shank of the threaded fastener extending in the opening adjacent the one bolt stop raised section and the underside surface of the threaded fastener head seated against the wheel hub flange,
wherein the bolt stop raised sections each include:
an upper stop surface configured to abut the flattened portion of the upper head side surface of one of the threaded fasteners; and
a lower undercut below the upper stop surface.

8. The wheel retention assembly of claim 1 wherein:
the wheel hub bolt stop raised section is integral with the hub flange and extends axially from an outer edge of the wheel hub flange.

9. A wheel retention assembly comprising:
a wheel hub having a flange with a plurality of openings and a bolt stop raised section adjacent each opening, each opening having a circumference thereof;
the bolt stop raised section of the wheel hub flange extending for less than the entire circumference of the adjacent opening;
a plurality of threaded connectors each configured to be received in one of the wheel flange openings,
each threaded connector having a head with a flattened portion configured to contact the bolt stop raised section of each wheel hub flange and limit turning of the threaded connector.

10. The wheel retention assembly of claim 9 wherein:
each threaded connector comprises a threaded portion extending axially through the wheel hub flange opening and beyond the wheel flange.

11. The wheel retention assembly of claim 9 wherein the openings of the flange are each circular, and
wherein each bolt stop raised section has a planar stop surface extending normal to a radius of the adjacent opening.

12. The wheel retention assembly of claim 9 wherein:
the threaded connector is received in the wheel hub flange opening in a clearance fit.

13. The wheel retention assembly of claim 9 wherein the bolt stop raised sections and the flange of the wheel hub have a unitary, one-piece construction.

14. The wheel retention assembly of claim 9 wherein:
the wheel hub bolt stop raised section is integral with the hub flange and extends axially from an outer edge of the wheel hub flange.

15. The wheel retention assembly of claim 9 wherein the bolt stop raised sections each include:
an upper surface configured to abut the head flattened portion of one of the threaded connectors; and
a lower undercut below the upper surface.

16. The wheel retention assembly of claim 9 wherein:
the wheel hub bolt stop raised sections each include an upstanding wall extending tangentially to one of the threaded fastener heads.

17. A wheel retention assembly comprising:
a wheel hub having a flange with a plurality of openings and a stop adjacent each opening;
a plurality of elongate connectors each having an upper head, a lower shank, and a length extending therebetween;
the lower shank of each connector configured to extend in one of the openings of the flange;
the upper head of each connector having an upper surface extending transverse to the length of the connector, a side surface extending along the length toward the lower shank, and an underside surface extending inwardly from the side surface to the lower shank;
a flattened portion of the upper head side surface of each connector head configured to be in confronting relation with one of the stops of the wheel hub flange with the lower shank of the connector extending in the opening adjacent the one stop and the underside surface of the connector upper head seated against the wheel hub flange,
wherein each stop includes an upper stop surface configured to abut the flattened portion of the upper head side surface of the connector, and
a lower undercut below the upper stop surface.

18. A wheel retention assembly comprising:
a wheel hub having a flange with a plurality of openings and a stop adjacent each opening;
a plurality of elongate connectors each having an upper head, a lower shank, and a length extending therebetween;
the lower shank of each connector configured to extend in one of the openings of the flange;
the upper head of each connector having an upper surface extending transverse to the length of the connector, a side surface extending along the length toward the lower shank, and an underside surface extending inwardly from the side surface to the lower shank;
a flattened portion of the upper head side surface of each connector head configured to be in confronting relation with one of the stops of the wheel hub flange with the lower shank of the connector extending in the opening adjacent the one stop and the underside surface of the connector upper head seated against the wheel hub flange;
wherein each opening of the wheel hub flange has a circumference; and
wherein each stop extends for less than the entire circumference of the adjacent opening.

19. The wheel retention assembly of claim 17 wherein each upper stop surface includes a planar surface configured to abut the flattened portion of the upper head side surface of the connector.

20. The wheel retention assembly of claim 17 wherein the stops and the flange of the wheel hub have a unitary, one-piece construction.

21. A wheel retention assembly comprising:
a wheel hub having a flange with a plurality of openings and a stop adjacent each opening;
a plurality of elongate connectors each having an upper head, a lower shank, and a length extending therebetween;
the lower shank of each connector configured to extend in one of the openings of the flange;
the upper head of each connector having an upper surface extending transverse to the length of the connector, a side surface extending along the length toward the lower shank, and an underside surface extending inwardly from the side surface to the lower shank;
a flattened portion of the upper head side surface of each connector head configured to be in confronting relation with one of the stops of the wheel hub flange with the lower shank of the connector extending in the opening adjacent the one stop and the underside surface of the connector upper head seated against the wheel hub flange,
wherein each stop includes an upstanding wall extending tangentially to the adjacent opening.

22. The wheel retention assembly of claim 17 wherein:
the connectors are received in the wheel hub flange openings in clearance fit.

* * * * *